United States Patent [19]

Higgins et al.

[11] Patent Number: 5,053,868

[45] Date of Patent: Oct. 1, 1991

[54] VIDEO MONITORING SYSTEM FOR AUTO DRIVE-THROUGH FAST FOOD RESTAURANTS

[75] Inventors: Clair M. Higgins, Los Angeles; Perry O. Ward, Van Nuys, both of Calif.

[73] Assignee: Broadcast Equipment Rental Company, Burbank, Calif.

[21] Appl. No.: 584,296

[22] Filed: Sep. 18, 1990

[51] Int. Cl.$^5$ ............................................. H04N 7/18
[52] U.S. Cl. ...................................... 358/93; 358/108; 340/942
[58] Field of Search ...................... 358/108, 93, 229; 340/933, 937, 942

[56] References Cited

U.S. PATENT DOCUMENTS

| | | | |
|---|---|---|---|
| 2,912,066 | 11/1959 | Ellithorpe | 358/93 X |
| 3,294,342 | 12/1966 | McClure et al. | 358/93 X |
| 4,073,368 | 2/1978 | Mustapick | 358/93 X |
| 4,120,004 | 10/1978 | Coutta | 358/108 |
| 4,735,289 | 4/1988 | Kenyon | 340/942 X |
| 4,916,429 | 4/1990 | Hicks et al. | 340/942 X |

*Primary Examiner*—Victor R. Kostak
*Attorney, Agent, or Firm*—Philip D. Junkins

[57] ABSTRACT

Apparatus is provided for the video intercommunication between a drive-through customer at the outdoor ordering station and the indoor order-taking clerk at the order processing station of a fast food restaurant. A first video camera is located at the food ordering station and positioned to electronically capture video images of an auto-borne customer while placing a food order. A second video camera is located at the order-taking station and positioned to electronically capture video images of the order-processing clerk. A first video monitor is located at the order-taking station for displaying the video images of the customer and a second video monitor is located at the food ordering station for displaying the video images of the order-processing clerk. A computerized cash register with food order and cash display is located at the order-taking station. A controller is electronically interconnected to the first and second video cameras, to the first and second video monitors, and to the computerized cash register and includes switches operated by the order-processing clerk to selectively interconnect the first video camera and the second video camera to the first video monitor and to selectively interconnected the second video camera and the computerized cash register to the second video monitor.

7 Claims, 2 Drawing Sheets

VIDEO MONITORING SYSTEM FOR AUTO DRIVE-THROUGH FAST FOOD RESTAURANTS

BACKGROUND OF THE INVENTION

The apparatus and system of the present invention relate to the communication of orders for food from an automobile at auto drive-through fast food restaurants. More particularly, the invention relates to the personalization of the ordering process between customers in automobiles at fast food restaurants and the food order-taking personnel at such restaurants.

At the present time the procedure for ordering food from an automobile at fast food restaurants involves communication between the auto driver or passenger and the fast food order-taking person via audio intercom systems. The auto customer, at the drive-through order station, is presented with a menu sign (with food item pricing) and after deciding on a selection of food items the customer communicates the order through an audio intercommunication system to the order-taking person. Thereafter, the auto-borne customer drives to an order pick-up station whereat he or she receives the packaged food order and pays the restaurant's food delivery clerk.

The above described fast food order-processing system between an automobile customer and the restaurant's service person is entirely impersonal and the accuracy of the taken food order is dependant upon audio presentation of the food order by the customer and audio restatement of the order by the restaurant's order-taking clerk.

It is an object of the present invention to provide video monitoring apparatus, in association with the standard audio communication system, at the auto drive-through food ordering stations of fast food restaurants.

It is a further object of the invention to provide a system for the presenting and taking of food orders at drive-through stations of fast food restaurants wherein the food-ordering customer views the order clerk during the customer's giving of a food order and the restaurant's order-taking clerk is viewed by the customer during the order taking process.

It is still a further object of the invention to provide apparatus and a system for use by drive-through fast food restaurants, at automobile ordering stations of such restaurants, whereby the customer is presented through a video monitor at such stations with a view of the order-taking person and at the conclusion of the ordering process a view of the order as typed into the restaurant's register system with the food pricing indicated and the total cost of the order presented.

Other objects and advantages of the invention will be apparent from the following summary and detailed description of the invention, taken with the accompanying drawing figures.

SUMMARY OF THE INVENTION

The present invention relates to a unique combination of audio and video apparatus for use by drive-through fast food restaurants to enhance the personal communications contact between the automobile-borne customer and the restaurant's order processing clerk and to provide the customer with a video display view of the completed order with the cost thereof by item and the total cost of the order before the customer leaves the ordering station. Thus, both the order-taking clerk and the customer are provided with a full opportunity to view the totality of the fast food order and to correct same should there be an error in the order or a change in the order upon review by the customer before he or she proceeds to the order pick-up station of the restaurant.

In accordance with the invention the video-audio intercom apparatus at the auto-borne customer ordering station of the restaurant comprises an outdoor monitor cabinet including: a color television (CRT) unit, protected within the cabinet, oriented so that the images shown on the monitor screen are projected to the customer via a mirror through a high-strength, non-reflective laminated glass viewing panel; a black and white video camera (focused through the glass viewing panel) for picking up the image of the customer; and a microphone/speaker unit for audio interconnection with the order processing clerk within the restaurant. There may also be provided at the customer ordering station a vehicle sensor which activates the video-audio intercom system of the invention upon the arrival at such station of a vehicle. At the order processing station within the fast food restaurant there is positioned a communications monitor/camera stand in front of the order processing clerk including: a black and white indoor television (CRT) unit, for projecting the customer's image to the clerk; a color video camera (focused at the order clerk) for picking up the image of the clerk interacting with the customer; and a microphone/speaker unit for audio intercommunication with the customer. There may also be provided at the order processing station (within the restaurant) an infrared sensor which completes the activation of the video-audio intercom system upon the presence of the order processing clerk at the monitor/camera stand.

Through the apparatus and system of the invention, the visual image of the customer (black and white video transmission) is transmitted to the order processing clerk and the visual image of the clerk (video color transmission) is transmitted to the customer. Audio communication between the customer and the clerk is carried on via a standard audio system including microphones and speakers at both the ordering and order receiving stations. The order processing clerk is provided with means to adjust the alignment and focus of the color video camera (within the restaurant) directed on such clerk so that a properly centered and clear image of the clerk is projected to the customer. In association with the clerk's order processing cash register keyboard there is provided control means for projecting to the customer, via the outdoor color monitor, the list of food items ordered by the customer, the pricing per item, and the total cost to the customer of the order. Thus, the customer is provided with ready means for reviewing his or her food order and an opportunity to revise and/or add to the order before proceeding to the order pick-up station of the drive-through area of the restaurant. Initially the system projects to the auto-borne customer (via the outdoor color monitor) the restaurant logo, advertising material, and/or the fast food menu of the restaurant. Thus, through the present invention there is provided apparatus and a system which provides a personal communication repartee between the auto-borne customer and the inside order clerk of a fast food restaurant, both audio and visual, and provides means for the accurate recording of the fast food order by the clerk and confirmation of the accuracy of the order by the customer.

BRIEF DESCRIPTION OF THE DRAWING FIGURES

The invention, as summarized above, and the foregoing objects, features and advantages of the invention will become more apparent hereinafter from the following detailed description of the invention taken in conjunction with the accompanying drawing wherein.

DETAILED DESCRIPTION OF THE INVENTION

Figure 1:
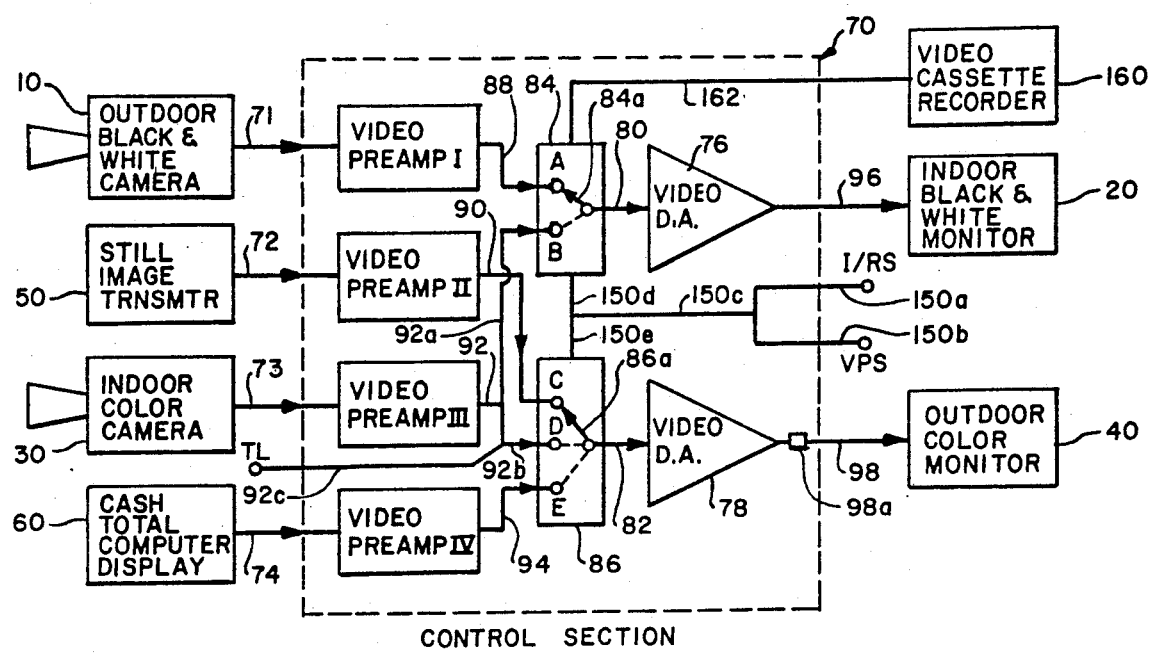
FIG. 1 is a block diagram of the video communication apparatus and system of the fast food ordering system of the present invention showing video camera interconnection with image display monitoring apparatus and the control section of the system.

Referring now to the drawings, a preferred embodiment of the general circuitry and apparatus components of the video section of the "auto-borne customer to food order clerk" fast food restaurant communication system of the invention, is illustrated in the block diagram of FIG. 1. The interconnected apparatus components or modules of the video communication system include: an outdoor black and white video camera 10; an indoor black and white video monitor 20; an indoor color video camera 30; an outdoor color video monitor 40, a still image transmitter (color video camera viewing still color images or still image player) 50; and a cash total computer display unit 60, all interconnected through a control section 70.

The control section 70 includes video pre-amplification circuitry sections I, II, III and IV which receive their video input signals from outdoor black and white video camera 10, still image transmitter 50, indoor color video camera 30, and cash total display unit 60, respectively, via coaxial electrical connectors 71, 72, 73, and 74, respectively. The control section 70 also includes video image distribution amplifiers 76 and 78 which receive their video input signals from video preamps I, II, III, and IV via electrical connectors 80 and 82, respectively, as directed by electronic or manual switches 84 and 86, respectively. The switch 84 is bi-polar with the switch arm 84a in contact with pole A (the position shown in FIG. 1) or in contact with pole B. The switch 86 is tri-polar with the switch arm 86a in contact with pole C (the position shown in FIG. 1) or in contact with poles D or E. In a preferred embodiment of the invention (as previously mentioned and as described hereinafter) the switches 84 and 86 may be interconnected to, and activated by, a vehicle pressure sensor and an infrared person sensor.

The electronic or manual switches 84 and 86, as previously stated, receive video input signals from video preamps I, II, III, and IV and act to route such input signals to either or both of the video image distribution amplifiers 76 and 78 and their respective video monitors 20 and 40. Thus, video preamp I is interconnected via electrical connector 88 to switch pole A of switch 84 whereby when switch arm 84a is in contact with pole A of such switch the auto-borne customer image, picked up by outdoor black and white video camera 10, is transmitted (via connector 80, distribution amplifier 76 and connector 96) to the indoor black and white video monitor 20 for viewing by the food order-taking person of the fast food restaurant. Video preamp II is interconnected via electrical connector 90 to switch pole C of switch 86 whereby when switch arm 86a is in contact with pole C of such switch the auto-borne customer views through outdoor color video monitor 40 the restaurant's logo, advertising material and/or menu as transmitted by the still image transmitter 50 through preamp II, connector 90, switch 86, connector 82, distribution amplifier 78 and electrical connector 98.

Video preamp III is interconnected via electrical connector 92 to switch pole B of switch 84 (via secondary electrical connector 92a) and to switch pole D of switch 86 (via secondary electrical connector 92b). Thus, if the food order-taking person within the fast food restaurant desires to view his or her image (picked up by indoor color video camera 30 and video preamp III) for the purpose of image alignment and focus, switch arm 84a of switch 84 is moved into contact with pole B of such switch. Thereby the image of the order-taking person is transmitted via preamp III (and connectors 92 and 92a, switch 84 and connector 80) to distribution amplifier 76 and thereafter via electrical connector 96 to the indoor video monitor 20 for display as a black and white image of such person. After image alignment and focus, as described above, the food order-taking person normally moves or electronically activates the switch arm 84a of bi-polar switch 84 to pole A so that the video image of the auto-borne customer is displayed on the indoor black and white video monitor 20 for viewing by such person. At the same time, switch arm 86a of tri-polar switch 86 is moved or activated into contact with switch pole D of such switch so that the color image of the order-taking person within the fast food restaurant (picked up by indoor color camera 30 and video preamp III) is transmitted via electrical connectors 92 and 92b, switch 86, electrical connector 82, video distribution amplifier 78, and electrical connector 98 to outdoor color video monitor 40 for viewing by the auto-borne customer. With the switch arm 86a of switch means 86 in contact with pole D of such switch means (providing transmission of the image of the order-taking person to the customer) a tally light TL at the order receiving station is illuminated through electrical interconnection with switch pole D via electrical connector 92c. The purpose of the tally light is to make the order-taking person aware that his or her image is being transmitted to and shown on the outdoor monitor 40.

Video preamp IV is interconnected (via electrical connector 74) with the order list and cash total display of the computerized cash register operated by the order-taking person within the fast food restaurant. The order list and cash total display information received by video preamp IV may be displayed to the auto-borne customer on outdoor color video monitor 40 by moving switch arm 86a of switch 86 into contact with pole E of such switch thereby passing such information from the video preamp IV via electrical connector 94, switch 86, electrical connector 82, video distribution amplifier 78, and electrical connector 98 to such color monitor. Upon verbal advice from the auto-borne customer (via an audio communication system between the customer ordering station and the order-taking station) that the food order has been properly received and recorded by the order-taking person within the restaurant, the food order is "frozen" within the computerized cash register and the customer is advised verbally to proceed to the order pick-up station of the drive-through restaurant. In the electrical connector 98, between video distribution amplifier 78 and outdoor video monitor 40, there is located a lost detection unit 98a (of known design) which provides a black signal to such monitor to protect same from damage when there is a loss of video signal.

It is to be understood that the video communication system of the present invention, utilized in connection with the ordering and order processing of food orders from auto-borne customers at drive-through stations of drive-through fast food restaurants, is accompanied by known two-way audio communication systems utilized by such restaurants. Further, it is to be understood that video preamp units of the control section of the present video communication system are of known design and that the video distribution amplifiers of the system are also of known design. Also, it is to be fully understood that the bi-polar and tri-polar switches 84 and 86 of the system can, within the scope of the present invention, comprise manual or electronic switching means with all circuit switching commands given to the system by a series of buttons in combination with a vehicle pressure sensor VPS and an infrared sensor I/RS, as shown in FIG. 1.

The infrared sensor I/RS, located at the order-receiving station of the system to detect the presence of the order-taking clerk, is interconnected to switches 84 and 86 via electrical connectors 150a, 150c, 150d and 150e. The vehicle pressure sensor VPS, located at the customer ordering station to detect the presence of a vehicle bearing a customer, is interconnected to switches 84 and 86 via electrical connectors 150b, 150c, 150d and 150e. The video monitoring system of the present invention may also be provided with a video cassette recorder (VCR) means 160, interconnected to switch 84 via electrical connector 162, whereby the live images of the fast-food ordering customer and the order-taking clerk may be recorded for image storage purposes.

Figures 2, 3:
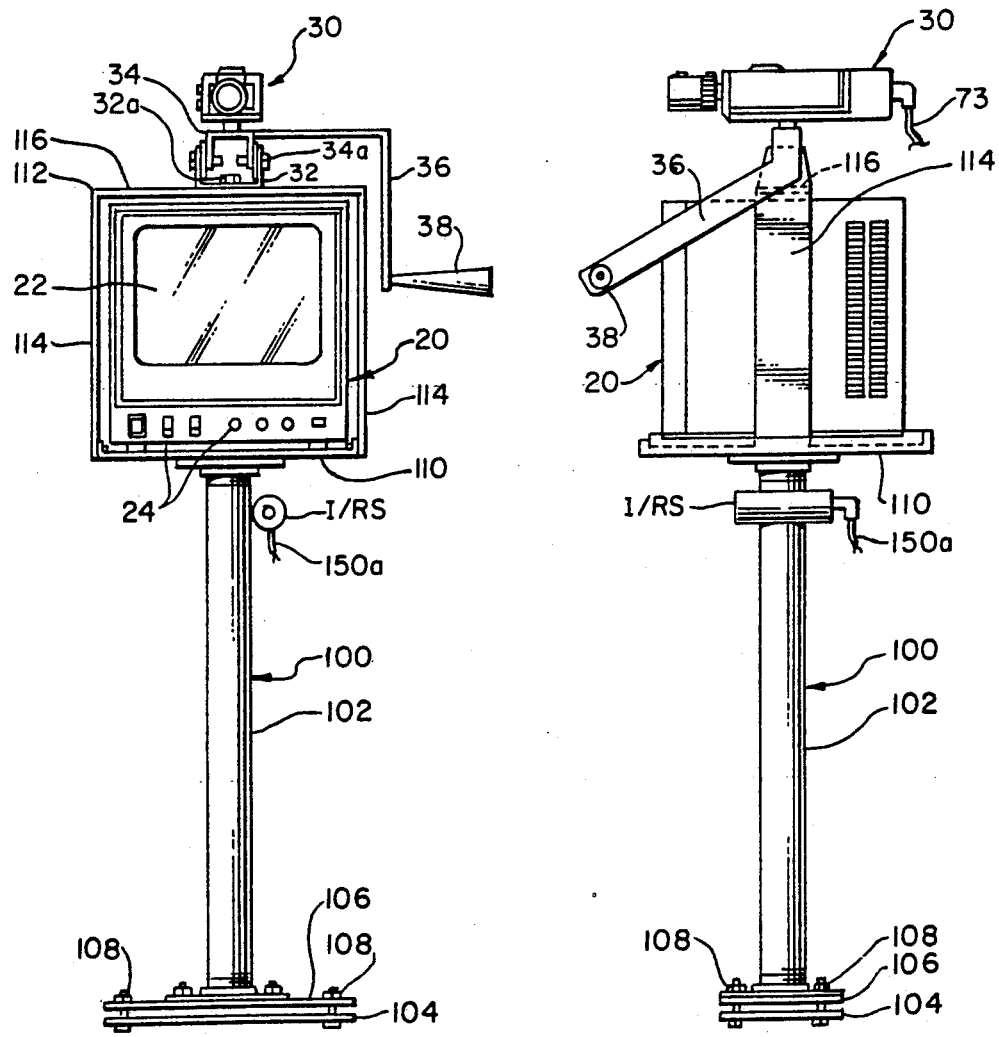
FIG. 2 is a front view of the black and white video monitor and color video camera stand at the order processing station within a fast food restaurant for servicing drive-through customers of such restaurant.
FIG. 3 is a side view of the video monitor and video camera stand of FIG. 2.

Referring now to FIGS. 2 and 3 of the drawings, there is shown in front and side view presentation a black and white video monitor, color video camera unit, and stand designed for utilization in the video communication system of the invention at the order processing station within a fast food restaurant in accordance with the present invention. The indoor black and white video monitor 20 (principally for display to the food order-taking person of the video image of the auto-borne customer) is mounted on monitor/camera stand 100. Also mounted to the stand 100, and positioned atop the monitor 20, is a color video camera 30 for picking up the image of the order-taking person and the transferring of same, via the control section 70 of the video communication system, to the color video monitor located at the drive-through customer ordering station of the restaurant.

The monitor/camera stand 100, with its supported video monitor 20 and video camera 30, is positioned at the order-processing station within the fast food restaurant whereat food orders from drive-through customers are received and processed. The video monitor 20 and camera 30 face the order-taking person and are oriented closely behind the computerized order processing cash register utilized by such person. The switch devices 84 and 86 (manual or electronic switch devices) for the video communication system of the invention are located in close proximity to the computerized cash register. Alternatively, the switching devices of the system may be wired directly into the cash register with special keys utilized as switch buttons to control the system.

The black and white video monitor 20, as illustrated in FIGS. 2 and 3, may be of any standard (off-the-shelf) design with a CRT tube 22 for image display and should include controls 24 for power on/off, sound volume, and picture contrast, brightness and sharpness. Alternatively, the monitor 20 may utilize a liquid crystal type image display device (LCD) or a light emitting diode type image display device (LED). The monitor/camera stand 100, as shown in FIGS. 2 and 3, includes: a pedestal portion 102; floor mounting plates 104 and 106 with appropriate bolts 108; a top plate 110 for support of the video monitor 20; and a video camera mounting bracket 112 including vertical side supports 114 and a top camera support plate 116. A rotatable mounting bracket 32 is affixed to the top plate 110 of stand 100 via a bolt 32a and a camera mounting bracket 34 is pivotally affixed to the bracket 32 via bolts 34a.

The color video camera 30 is affixed to the top portion of the bracket 34 and the image framing alignment of the camera, for proper reception and transmission of the image of the order-taking person, is accomplished through adjustment arm 36 (affixed at its inboard end to camera mounting bracket 34) and handle 38 (affixed to the outboard end of arm 36). Thus, the color video camera 30 (of known design) can be moved (aimed) upwardly or downwardly from its horizontal position (as shown in FIG. 3) by upward or downward movement of handle 38 by the order-taking person. The camera is electrically interconnected to the control section of the video communication system of the invention via electrical connector 73 shown in both FIG. 1 and FIG. 3. The pedestal portion 102 of monitor/camera stand 100 also may support the I/RS sensor unit for detecting the presence of the order-taking person or clerk at the order processing station. Such sensor is interconnected to switch means 84 and 86 via electrical connectors 150a, 150c and connectors 150d (for switch 84) and 150e (for switch 86).

Figure 4:
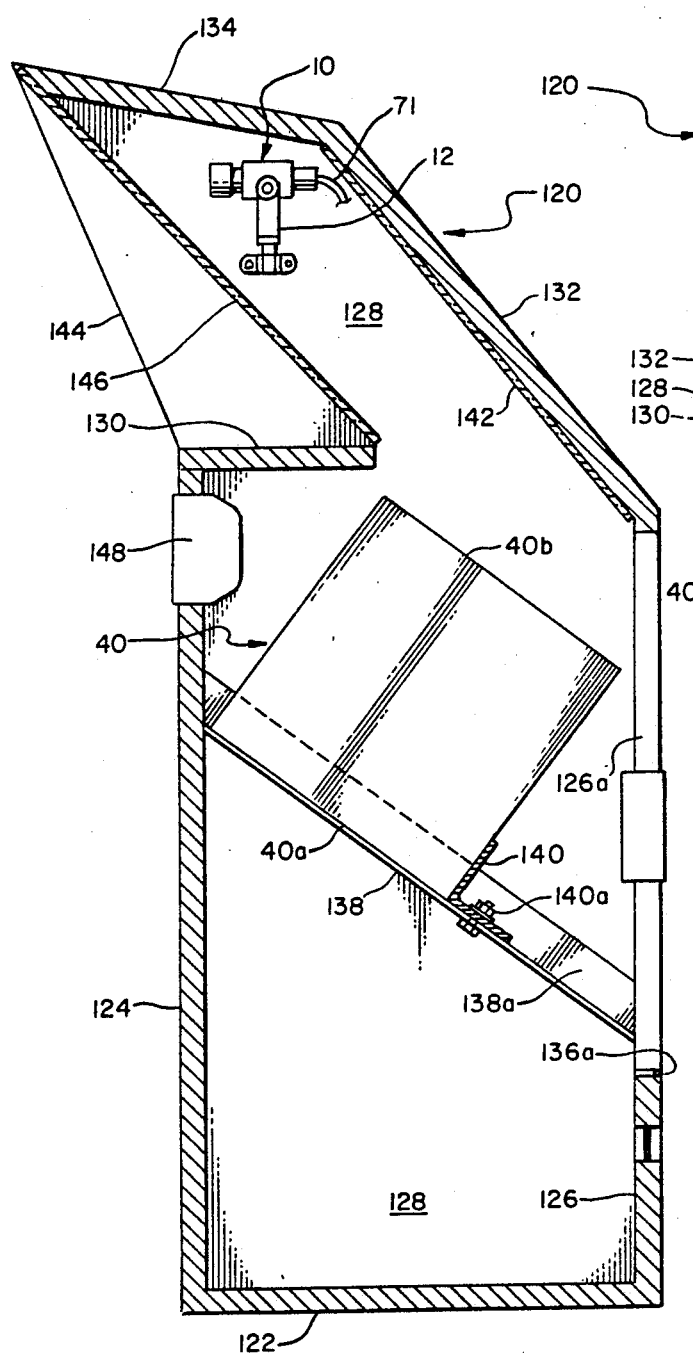
FIG. 4 is a side sectional view of the outdoor audio-video monitor cabinet at the automobile drive-through ordering station at a fast food restaurant in accordance with the present invention.
Figure 5:
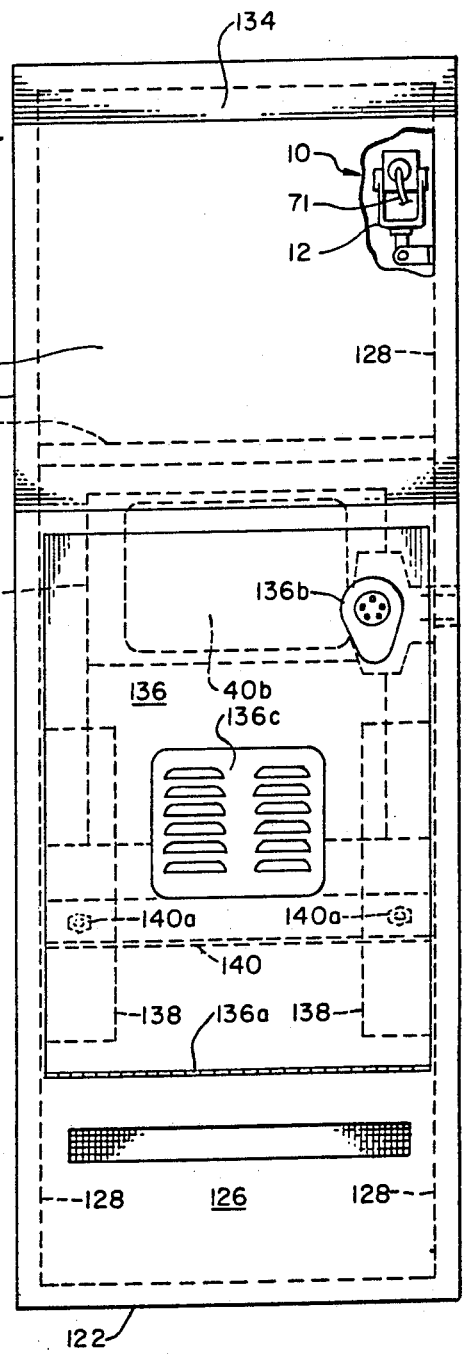
FIG. 5 is a rear view of the outdoor audio-video monitor cabinet of FIG. 4.

Referring to FIGS. 4 and 5 of the drawings, there is shown a side sectional view and a rear view of the outdoor audio-video monitor cabinet 120 (and enclosed color video monitor, black and white video camera and microphone-speaker unit) of the video communication system of the invention for placement at the automobile drive-through ordering station of a fast food restaurant. The outdoor cabinet 120, designed to provide high security for its audio-video equipment contents, is constructed of: a base wall 122; a front wall 124; a rear wall 126; and side walls 128. The upper portion of cabinet 120 includes: a horizontally extending wall section 130 projecting inwardly for a short distance from the upper edge of the front wall 124; and top sloping wall portions 132 and 134 extending from the upper edge of the rear wall 126 to a point forward and above the front wall 124.

The rear wall 126 of cabinet 120 is provided with an opening 126a which is normally closed off by a rear door 136. The rear door or access hatch 136 is hinged at its lower edge to rear wall 126 by hinge 136a and is secured in its closed position by any suitable locking mechanism 136b, as generally shown in FIG. 5. The cabinet 120 is ventilated by the passage of air through an air vent panel 136c located in rear door or access hatch 136. Spanning the cabinet, at each side thereof, are mounting platforms 138 which extend from the rear wall 126, proximate the lower end of opening 126a, upwardly in slopping fashion to the front wall 124. The mounting platforms 138 are affixed within the cabinet 120 via flange portions 138a thereof. Supported on the mounting platforms 138 is the outdoor color video monitor 40 with the rear side 40a of such monitor resting on such platforms. The monitor 40 is maintained in the upper area of the sloping platform 138 by a retaining angle member 140 bolted to the platforms by bolts 140a. The video image display face 40b (CRT tube) of monitor 40 is oriented upwardly and rearwardly within the cabinet.

The inner surface of sloping wall portion 132 is provided with a mirror 142 and the cabinet front opening 144 is closed by a sheet of laminated, high-strength, non-reflecting glass 146 which extends at its lower edge from the inner edge of horizontal wall section 130 to the upper front edge of slopping wall portion 134. The forwardly sloping orientations of mirror 142 and non-reflecting glass sheet 146, and the orientation of the color video monitor within the cabinet 120, are such that the video image of the order-taking person within the restaurant shown via the color video monitor 40 within the cabinet 120 is projected to the mirror 142 and reflected forwardly through the glass sheet 146 for viewing by the auto-borne customer positioned within his or her automobile at the food ordering station of the fast food restaurant.

Located within the outdoor audio-video cabinet 120, and depending from the side wall 128 thereof, is the black and white video camera 10 of the video communication system of the invention. The camera 10 is mounted to wall 128 via mounting bracket 12 and is oriented and focused through the non-reflective glass sheet 146 toward the focal area within which the auto-borne, drive-through customer will be positioned during the food ordering procedure. Also located within the cabinet 120 at the upper portion of the front wall thereof is a microphone/speaker unit 148 through which the drive-through customer audibly communicates his or her food order to the order-taking person within the fast food restaurant.

In operation of the video communication apparatus and system of the food ordering system of the invention as applied to a fast food restaurant having a drive-through ordering station, the sequence of events are as follows: 1) An auto-borne customer drives to the ordering station and views in color through the non-reflective glass panel of the outdoor audio-video monitor cabinet one or more still image presentations including the restaurant logo, advertised food specials, and the food menu. The presence of the customer is detected by a vehicle pressure sensor (located underneath the pavement in front of the outdoor audio-video monitor cabinet) which is interconnected to the system's control section through controller switch means and activates the video system.

2) An infrared sensor detects the presence of an order-taking person in the order processing section of the fast food restaurant. Within a short period of time the customer views in color the order-taking person (restaurant clerk) and is asked by the order clerk for the customers food order which is thereafter received audibly by the clerk through the microphone/speaker unit at the ordering station.

3) The order clerk, while viewing the customer via the black and white monitor at the order processing station within the restaurant, enters the order via his or her computer keyboard associated with a cash register and order/cash display and upon command the clerk displays the order, as an item-by-item list with cash amounts and the cash total of the order, to the customer via the color video monitor at the ordering station.

4) The customer is given the opportunity to verbally change, correct and/or add to the order and is thereafter displayed the final order list and cash total and, if the order is approved (verbally by the customer) the order clerk "freezes" the order and tells the customer to proceed to the order pick-up station.

While the invention has been described in connection with a particular embodiment of apparatus and video circuitry for accomplishing the fast food order-processing between an automobile customer and an order-taking person, variances and modifications in the embodiment will be apparent to those skilled in the art. Accordingly, such modifications are to be included within the spirit and scope of the invention as defined by the following claims.

What we claim is:

1. Apparatus for video intercommunication between a drive-through customer at the outdoor ordering station and the indoor order-taking clerk at the order processing station of a fast food restaurant comprising:
   a) a first video camera located at the outdoor food ordering station of a fast food restaurant and positioned to electronically capture video images of a vehicle-borne customer at said station while placing a food order;
   b) a second video camera located at the indoor order-taking station of said restaurant and positioned to electronically capture video images of an order-processing clerk at said station while taking a food order;
   c) a first video monitor located at said indoor order-taking station for displaying the video images of said vehicle-borne customer at said food ordering station;
   d) a second video monitor located at said outdoor food ordering station for displaying the video images of said order-processing clerk at said order-taking station;
   e) a computerized cash register with a food order and cash total display located at said indoor order-taking station;
   f) a still image video player for transmitting still video images, including logos, advertising material and menus of said fast food restaurant, to said second video monitor for viewing by said vehicle-borne customer; and
   g) controller means electronically interconnected to said first and second video cameras, to said first and second video monitors, to said computerized cash register, and to said still image video player, and including first and second switch means,
   said first switch means operable by said order-processing clerk for selectively interconnecting said first video camera and said second video camera to said first video monitor whereby said clerk may view the video images of the vehicle-borne customer or may view video self-images, and said second switch means operable by said order-processing clerk for selectively interconnecting said second video camera, said computerized cash register and said still image video player to said second video monitor whereby said vehicle-borne customer may view video images of the order-processing clerk, may view the food order and cash total display of said computerized cash register, or may view still images including logos, advertising material and menus of said fast food restaurant.

2. Apparatus for the video intercommunication between a drive-through customer at the outdoor ordering station and the indoor order-taking clerk at the order processing station of a fast food restaurant as claimed in claim 1 wherein the controller means of said apparatus includes video pre-amplification circuitry between said first switch means and said first video camera, between said first switch means and said second video camera, between said second switch means and said second video camera, between said second switch means and said computerized cash register, and between said second switch means and said still image video player.

3. Apparatus for the video intercommunication between a drive-through customer at the outdoor ordering station and the indoor order-taking clerk at the order processing station of a fast food restaurant as claimed in claim 1 wherein the controller means of said apparatus includes video distribution amplification circuitry between said first switch means and said first video monitor and between said second switch means and said second video monitor.

4. Apparatus for the video intercommunication between a drive-through customer at the outdoor ordering station and the indoor order-taking clerk at the order processing station of a fast food restaurant as claimed in claim 1 wherein said first video camera and said second video monitor are mounted within a high security cabinet at said outdoor ordering station, said cabinet having a laminated, high-strength, non-reflecting glass panel located and mounted in its side wall facing the vehicle-borne customer through which the first video camera is focused to electronically capture video images of said customer, and said cabinet including mirror means mounted behind said non-reflecting glass panel within said cabinet and oriented so that the video images displayed by said monitor are projected to and reflected by said mirror through said glass panel whereby said customer may view the video images displayed by said second video monitor.

5. Apparatus for the video intercommunication between a drive-through customer at the outdoor ordering station and the indoor order-taking clerk at the order processing station of a fast food restaurant as claimed in claim 1 wherein said second video camera and said first video monitor are mounted on a stand at said indoor order processing station and said camera and said monitor are oriented on said stand whereby said second video camera is focused to electronically capture video images of said clerk and said clerk may view the video images displayed by said first video monitor.

6. Apparatus for the video intercommunication between a drive-through customer at the outdoor ordering station and the indoor order-taking clerk at the order processing station of a fast food restaurant as claimed in claim 1 wherein a vehicle pressure sensor is located at the outdoor ordering station of said restaurant for detecting the presence of a vehicle-borne customer at said station, said sensor being electrically interconnected to said controller means for activating the first and second switch means of said controller means.

7. Apparatus for the video intercommunication between a drive-through customer at the outdoor ordering station and the indoor order-taking clerk at the order processing station of a fast food restaurant as claimed in claim 1 wherein an infrared sensor is located at the order processing station of said restaurant for detecting the presence of an order processing clerk at said station, said sensor being electrically interconnected to said controller means for activating the first and second switch means of said controller means.

* * * * *